Feb. 19, 1929.

J. WEBB 1,702,328

CORN HARVESTING APPARATUS

Filed Feb. 7, 1925 5 Sheets-Sheet 2

Inventor.
Joseph Webb,
By C. W. Miles,
Attorney.

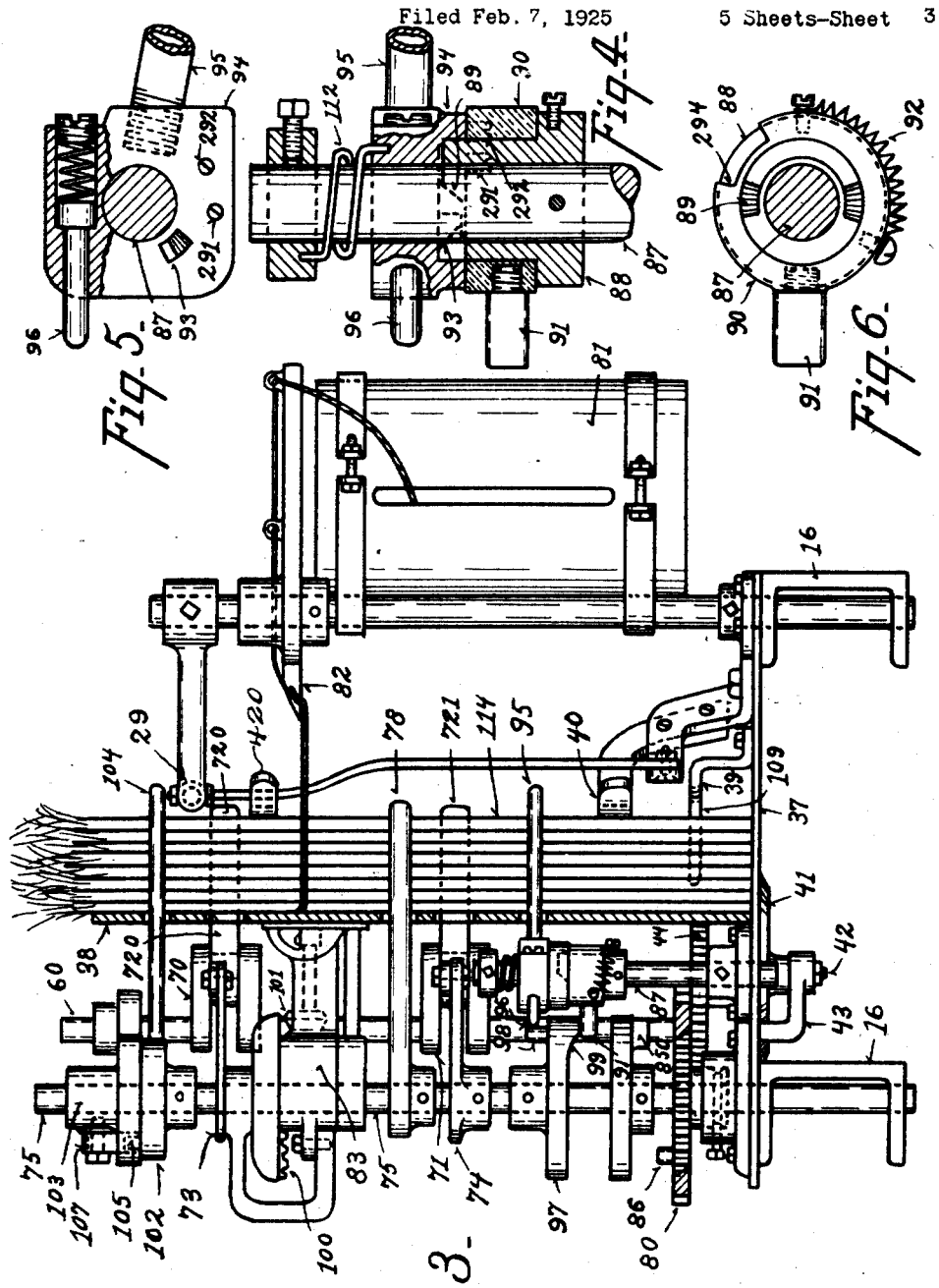

Feb. 19, 1929.
J. WEBB
1,702,328
CORN HARVESTING APPARATUS
Filed Feb. 7 1925
5 Sheets—Sheet 4
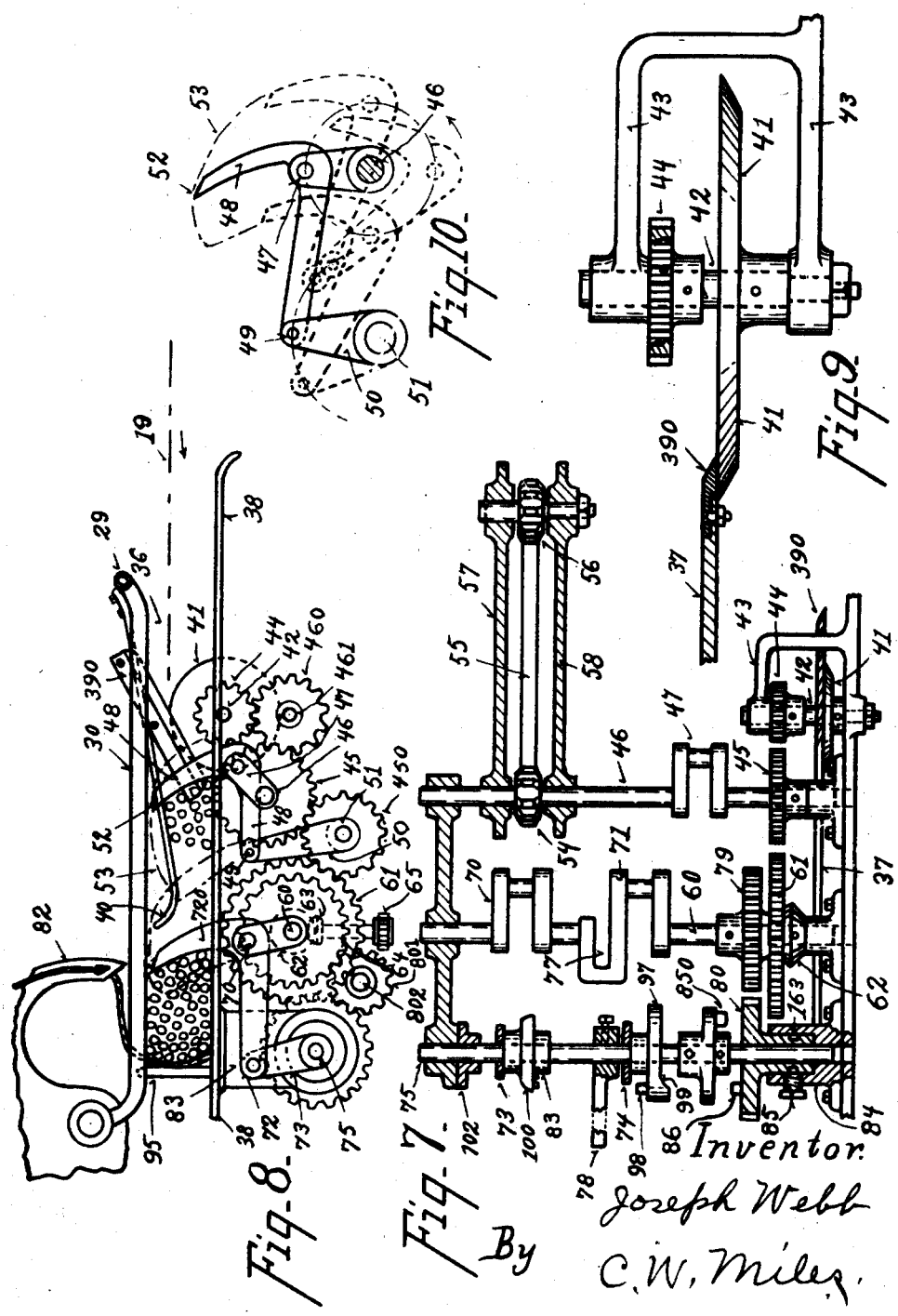
Inventor
Joseph Webb
By C. W. Miles.
Attorney.

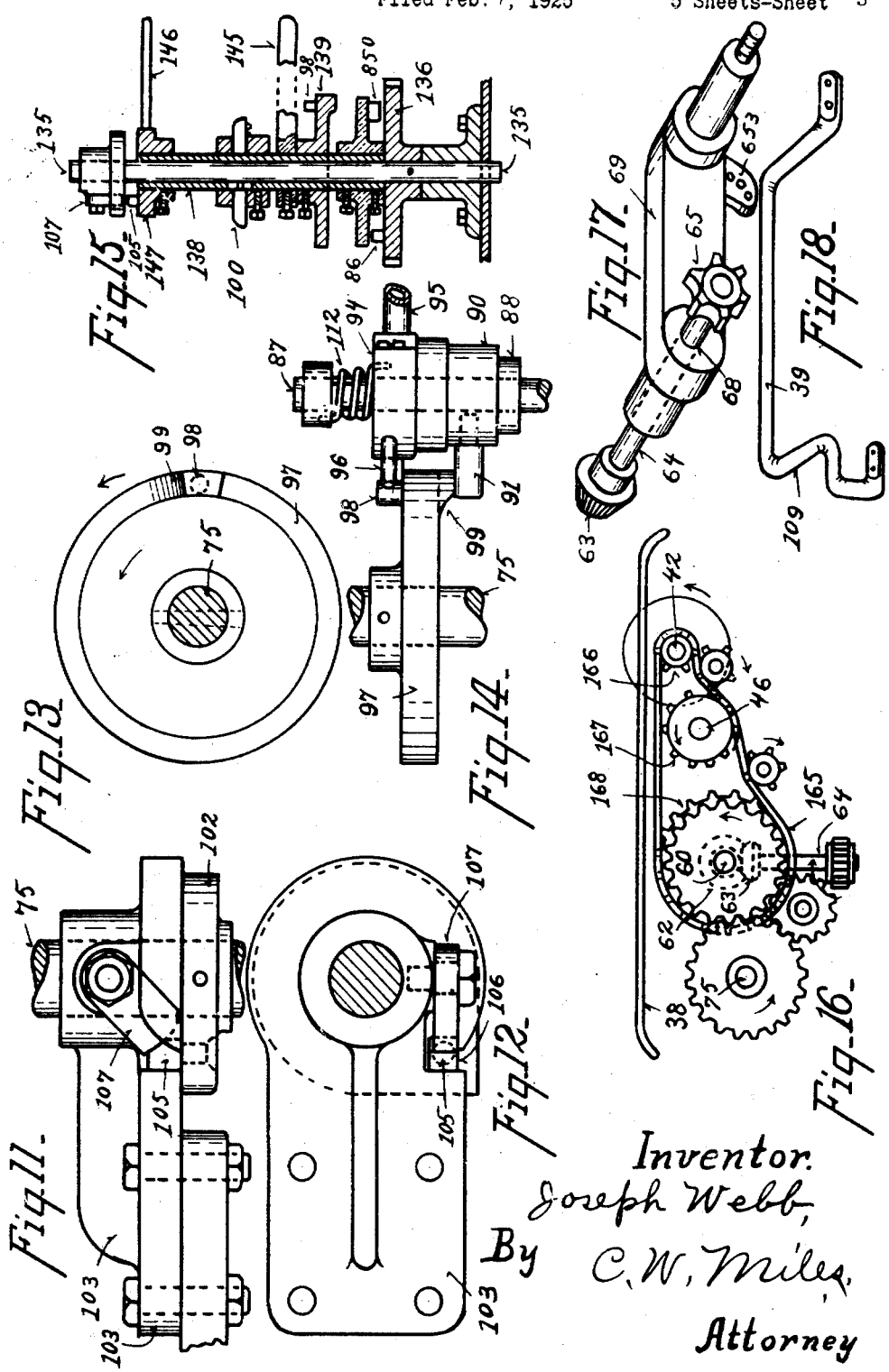

Patented Feb. 19, 1929.

1,702,328

UNITED STATES PATENT OFFICE.

JOSEPH WEBB, OF CINCINNATI, OHIO.

CORN-HARVESTING APPARATUS.

Application filed February 7, 1925. Serial No. 7,684.

My invention relates to improvements in corn harvesting apparatus. One of its objects is to provide improved severing means adapted not only to sever the corn stalks but to also reliably sever weeds and vines found in or near the corn rows, and which are generally more tough and difficult to sever than the corn stalks. Another object is to provide an improved arrangement of weed cleaning and corn feeding apparatus to feed and guide the corn stalks and weeds after being severed into relation to tying apparatus by means of which the corn stalks are tied into bundles and discharged from the harvesting apparatus at the rear thereof. Another object is to provide an improved arrangement of intermittent weed cleaning and bundle forming apparatus to feed the corn and weeds away from the severing means and later to form the corn into separate bundles ready to be tied. Another object is to provide improved bundle discharging means. Another object is to provide improved pick-up means to gather or straighten up corn stalks which are broken or bent out of the corn row, and direct them into the harvesting apparatus. Another object is to provide an improved corn harvesting apparatus adapted to be conveniently turned short or at sharp angles when the ends of the corn rows have been reached in order to conveniently commence upon the next pair of corn rows. Another object is to provide improved apparatus to feed and pack, and bunch the corn stalks preparatory to tying the bunches. Another object is to provide improved means to automatically release and carry out the cycle of operations required to tie the bunches and discharge the bunches from the harvesting apparatus. Another object is to provide an improved general assembly and organization for the purpose. Another object is to provide a corn harvesting apparatus adapted to operate with a minimum of power, and hence adapted to be drawn and operated by one or two horses. My invention also comprises certain details of form and combination and arrangement of components all of which will be fully set forth in the description of the accompanying drawings, in which:

Fig. 3 is a rear end view of a portion of the apparatus shown in Figs. 1 and 2.

Fig. 4 is a detail partly in central section of a latch or releasing apparatus employed to trip the shock or bundle tying apparatus.

Fig. 5 is a bottom plan of one of the latch members of Fig. 4, partly in section.

Fig. 6 is a top plan of another of the members shown in Fig. 4.

Fig. 7 is a diagrammatic view of the corn severing, feeding, packing, and tying members and their driving members.

Fig. 8 is a diagrammatic plan of the apparatus shown in Fig. 7.

Fig. 9 is an enlarged sectional detail of the corn severing apparatus detached.

Fig. 10 is a diagrammatic plan view of the movements of one of the corn packing or bunching members detached.

Fig. 11 is an enlarged side elevation of dog or latch mechanism employed to lock the tying apparatus in idle position.

Fig. 12 is a plan of the apparatus shown in Fig. 11.

Fig. 13 is a bottom plan of a cam employed to release the tying shaft from its idle position.

Fig. 14 is a sectional detail of the same taken on the line 14—14 of Fig. 13.

Fig. 15 illustrates a modification of the tying shaft and members carried thereby over that shown in Fig. 7.

Fig. 16 is a diagrammatic view illustrating a modification of the driving means shown in Fig. 8.

Fig. 17 is an enlarged detail of one of the supporting members between the traction wheels and the frame, detached.

Fig. 18 is a detail of a portion of the bundle ejecting apparatus.

Figure 1:
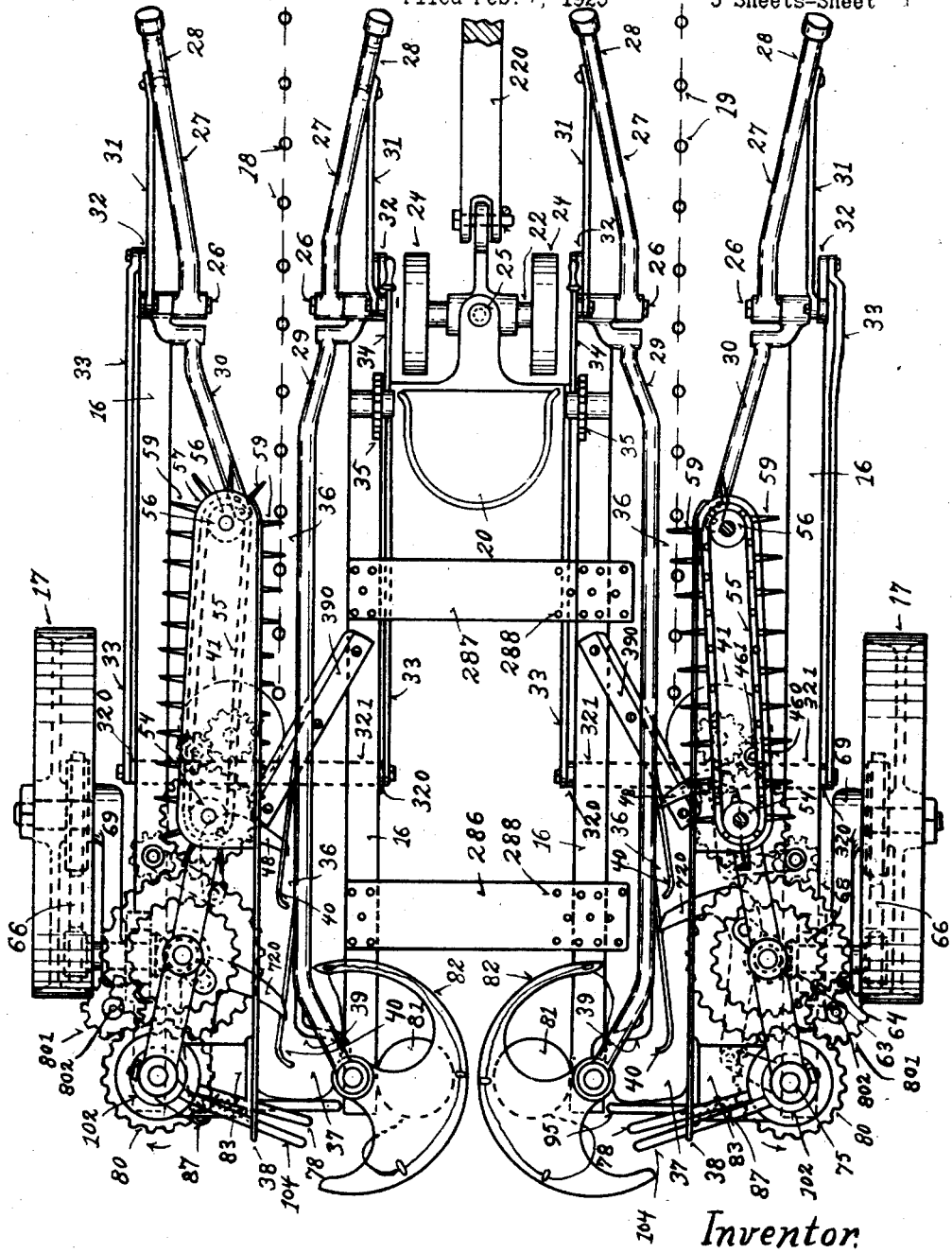
Fig. 1 is a plan view of a corn harvesting apparatus embodying my improvements.

The accompanying drawings illustrate the preferred embodiments of my invention in which 16 represents the main frame of the harvester which may comprise a series of parallel channel bars connected together by crossbars or plates. The frame 16 is supported toward its middle or rear end by means of a plurality of main or driven wheels 17 the axles of which are vertically adjustable relative to the frame 16 to provide for adjusting the height above the ground at which the corn stalks are to be severed. Two rows of corn stalks to be harvested 18 and 19 are indicated in Fig. 1, and substantially duplicate or counterpart mechanisms mounted upon opposite sides of the medial line of the frame 16 are employed and independently driven through the traction of the wheels 17. The forward end of the frame 16 is provided with a driver's seat 20, and is supported upon a short front axle 22 and pair of wheels 24 attached to the frame 16 by means of a king bolt 25. The harvester may be drawn by a single horse or by a small tractor hitched to a tongue 220 or by other means traveling between the corn rows 18 and 19.

Figure 2:
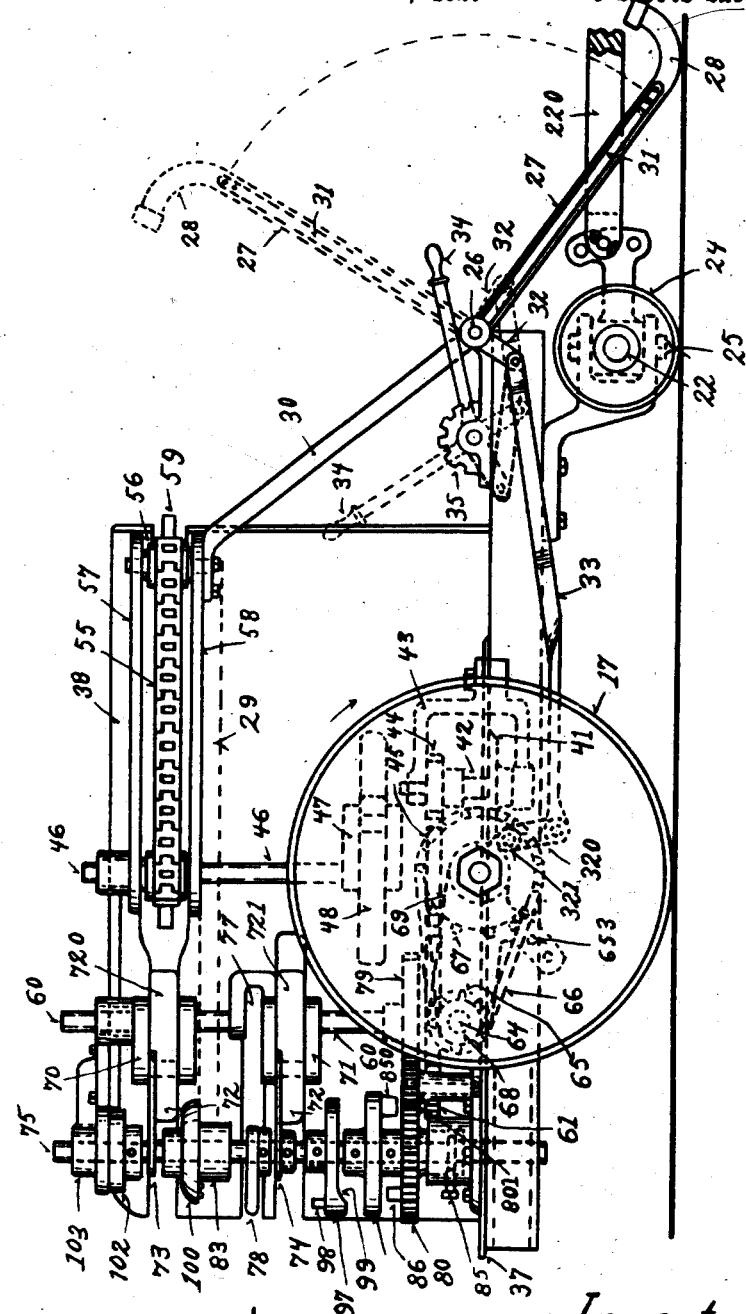
Fig. 2 is a side elevation of the apparatus shown in Fig. 1.

Pivotally attached at 26 to the forward end of the frame 16 are a series of forwardly extending pick-up or guide members 27, the forward ends 28 of which are curved and said curved ends rest upon and glide along over the surface of the ground in advance of the harvester and serve to engage any corn stalks which may have become broken or bent out of the corn rows and to direct and guide them back into position in the corn rows ready to be acted upon by the harvesting apparatus. Additional stationary guide members 29 and 30 mounted upon the frame 16 serve to guide the corn stalks after they leave the rear ends of the guide members 27. The guide members 27 are provided with braces or tie rods 31, and are connected by means of crank arms 32, and links 33 together to crank arms 320 on a rock shaft 321 journaled to the frame 16 so as to move in pairs from the forwardly directed position shown in full line Fig. 2, to an elevated position shown in dotted line in Fig. 2 which elevated position facilitates storing the harvester in compact form in barns or sheds and turning sharp angles with the harvester whenever the ends of the corn rows are reached and it becomes necessary to get the harvester into position to harvest other adjacent corn rows. Hand levers 34 are provided to enable the operator to elevate the pick-up members 27 in pairs. Notched segments 35 engaged by latch members carried by the hand levers 34 enable the guide members 27 to be locked in their elevated positions when desired. The operating connections 320 and 321 between the links 33 are located beneath the frame 16 at a point in rear of the corn severing apparatus in order not to interfere with the corn standing in the row before it has been severed. The elevation of the members 27 also facilitates moving the harvester along the road from one field to another, and the storage of the harvester in barns or tool sheds.

A continuous straight guideway or channel 36 to support the severed corn stalks from the time they are severed to the time they have been tied and discharged from the harvester, is formed on the bottom by a continuous bottom plate 37, a perforated side plate 38, and the rear portion of upper guide rails 30 and 420, and lower guide rails 39 and 40. The corn stalks and any vines or weeds in the corn row are severed between a stationary diagonally arranged knife blade 390 mounted upon the front edge of the bottom plate 37 and a rotatable disk shaped knife 41 mounted rigidly upon the knife shaft 42. The shaft 42 is journaled at opposite ends in a forked bracket 43 attached to the frame 16. A spur gear 44 on the knife shaft is driven at a ratio of substantially two to one from a gear 45 mounted rigidly upon a vertically journaled weed cleaner shaft 46 through an idler gear 460 shown in Figure 8 mounted upon a stud shaft 461. The shaft 46 has a crank 47 near its lower end to which is rotatably attached a weed cleaner 48, one end of which is pivotally attached at 49 to one end of a link 50. The opposite end of link 50 is rotatably attached to a stud shaft 51. When the crank shaft 46 rotates the free end 52 of the weed cleaner follows a prescribed path indicated approximately by the dotted line 53, see Figs. 8 and 10, whereby the free end 52 is alternately advanced through a slot in the side plate 38 and travels rearwardly in the channel 36 to feed the weeds, vines and corn stalks in the lower portion of the channel 36 rearwardly over the upper face of the bottom plate 37, and between the side guides of channel 36 away from the knife members, and serving to prevent the channel 36 becoming choked in the neighborhood of the severing members. At the same time a sprocket chain 55 feeds the upper portion of the corn and weeds away from the severing members.

At the upper end of the shaft 46 is a sprocket wheel 54 which drives a sprocket chain 55 the opposite end of which is mounted upon an idler sprocket wheel 56 located in advance of the corn severing members. The sprocket chain 55 and wheels 54 and 56 are mounted between housing plates 57 and 58 to prevent corn stalks, blades, vines, etc. becoming entangled in said chain and wheels. The chain 55 is provided with a series of teeth or fingers 59 which project out into the upper part of the feeding channel 36 through the side guide plate 38 and serve primarily to straighten up the upper portion of the corn stalks and to guide and assist them into and through the upper portion of said channel 36, and to keep the stalks in a vertical position during and shortly before and after the severing operation, also to feed the severed product away from the severing members.

A crank shaft 60 is mounted in a vertical position and journaled near opposite ends to the frame of the machine. Said shaft 60 is provided with a gear 61 which drives the gear 45 on the shaft 46 at substantially a ratio of two to one through an idler gear 450 mounted upon the stud shaft 51. The shaft 60 is provided with a miter gear 62 meshing with a miter gear 63 on a shaft 64. The shaft 64 also carries at its opposite end a sprocket wheel 65 which is driven by means of a sprocket chain 66 from a sprocket wheel 67 mounted upon the hub of one of the traction wheels 17 on which the frame 16 is supported. The shaft 64 is journaled in the bore 68 of the crank arm 69 by means of which the wheel 17 is adjustably mounted relative to the frame 16.

The crank shaft 60 is provided toward its upper end with two cranks 70 and 71 upon which cranks respectively are mounted two corn bunchers or packers 720 and 721. The ends 72 of said bunchers are pivotally connected respectively to the free ends of links 73 and 74, which are in turn pivotally mounted upon the knotter shaft 75. The free ends of the bunchers 720 and 721 move in unison over a prescribed path whereby they are introduced through slots in the side plate 38 into the feed channel 36 rearwardly therein and move the corn stalks rearwardly therein and serve to gather the stalks into successive bundles or bunches at the rear of the feeding channel 36 against a plurality of removable bars or gates extending transversely across the rear end of the feed channel 36. The shaft 60 is also provided with an off-set 77 to enable a crank arm or bundle ejecting arm or lever 78 carried by the knotter shaft to pass said shaft 60. The knotter shaft is journaled near opposite ends to the frame 16, and is driven at the same rate of speed as the shaft 60 by means of a gear 79 mounted rigidly upon shaft 60 an idler gear 801 on stud shaft 802, and a gear 80 journaled in a sleeve 84 carried by the frame 16. A screw 85 engaging an annular recess 163 holds the gear 80 against movement endwise.

The relative feeding movements of the weed cleaner 48 and the packers or bunchers 720 and 721 are so arranged and timed first that the feed of the weed cleaners and the feed of the packers overlap in the channel 36, allowing the members 720 and 721 to take the corn stalks away from the members 48. Second, the movements of members 48 are so timed as not to feed corn stalks or weeds against the knotter needle while said needle is extended across the channel 36 in the act of tying a bundle. Third, the members 720 and 721 in taking the stalks from the members 48 form the stalks gathered by two feeding movements of members 48 into a relatively larger bunch or bundle and feed the stalks rearwardly in channel 36 against a tripping arm or gate 95 which is thereby forced away from its position across the rear-end of channel 36, and thereby initiates one revolution of the knotter shaft to thereby tie and eject the bundle delivered by members 720 and 721 at the rear end of the channel 36. The operation of the members 720 and 721 also serves the purpose of opening a gap in the channel 36 between the bundle being fed by said members and the stalks being fed rearwardly by members 48, at the proper time interval and for the purpose of providing an open and unobstructed path across channel 36 for the passage of the knotter needle while tying the bundles respectively.

The tying or knotting mechanism per se is not a part of my invention, being of known construction, and comprising a cylindrical bobbin 81, see Fig. 3 containing a ball of cord, a curved oscillating needle 82, and a tying or knotter member 83 mounted upon the plate 38 and knotter shaft 75. The special means employed upon and about the knotter shaft to adapt the knotting mechanism to tightly tie up bundles of corn stalks, which are more rigid and unyielding than the grain bundles to which the knotting mechanism has been heretofore applied, and the tripping and latch mechanism and ejector mechanism are a part of my invention.

The gear 80 by means of which the knotter shaft 75 is driven is seated in a cup shaped recess in the hub 84 forming part of the frame 16, and is confined against movement endwise by a screw 85 entering an annular recess 163 in the hub of gear 80. Gear 80 is intermittently clutched to the shaft 75 by means of a limited movement endwise of the shaft 75, which shifts the clutch member 850 into or out of the path of travel of the clutch member 86 carried by the gear 80. A stud shaft 87, see Fig. 4, is provided with a hub 88 and a cam face 89. A collar 90 provided with a laterally projecting pin 91 is journaled upon the hub 88, and is attached thereto by means of a coiled spring 92, whereby the collar 90 and pin 91 are free to move rotatably to a limited extent relative to the hub 88, and upon being released will be returned to its original position relative to collar 87 by means of the spring 92. Mounted upon the stud shaft 87 above the collar 90 is a collar 94 provided with a pin 93 to engage and ride up the cam face 89 of the collar 88. Collar 94 is also provided with an arm or trip gate 95 extending across the rear end of the feeding channel 36, and with an adjustably spring tensioned stud 96 in position to engage a pin 98 projecting from a cam plate 97 mounted rigidly upon the knotter shaft 75. The pin 91 is also in position to be intermittently engaged by a cam projection 99 carried by the cam plate 97 to lift the cam 97 and shaft 75 sufficiently to disengage the clutch members 85 and 86 to stop the rotation of the shaft 75 and also when the gate 95 is forced by a bundle of corn stalks to disengage the pin 91 from the cam projection 99 and engage clutch members 85 and 86 securing thereby one revolution of the shaft 75, and thereby tying a knot in the cord about the bundle of stalks. Rotation of the segmental gear 100 of the knotter 83 with the shaft 75 to which gear 100 is keyed causes the gear 100 to rotate a small miter gear 101 journaled to the member 83 which is attached rigidly to the plate 38, at an approximate interval in the extreme limit of movement of the needle, to tie a knot about the bundle of stalks in a manner known in the art.

At the upper end of shaft 75 is a collar or hub 102 rigidly attached to shaft 75 and located slightly below the upper journal bearing 103 of shaft 75. The hub 102 has an arm 104 serving as an ejector arm or gate extending normally across the rear end of the feed channel 36. The hub 102 also has an upwardly directed stud or stop pin 105 which when the shaft 75 is in its lower position is free from the bearing member 103, and which when the shaft 75 is in its upper position enters a recess 106, see Figs. 11 and 12, in the flange of bearing member 103 to act as a positive lock or stop to hold the shaft 75 rigidly against rotation until again released by the pin 91. A pawl 107 pivotally mounted upon the bearing member 103 and guided in its movements by said member 103 drops in rear of the stud 105 to prevent movement of the shaft 75 in reverse direction. An ejector arm or gate 78 carried rigidly by the shaft 75 and normally extending across the rear end of channel 36 rotates with shaft 75 and its extended end passes through the offset 77 in the shaft 60 provided for that purpose. The ejector gates 104 and 78 rotate with the knotter shaft, and after the bundle has been tied and just before shaft 75 completes its rotation, first gate 104 strikes the upper portion of the bundle and later gate 78 strikes the middle portion of the bundle while the lower end of the bundle is held by the offset 109 in the lower guide member 39 to thereby topple or eject the bundle from the rear end of channel 36, after which the gate or arm 95 energized by spring 112 springs back into position across the rear end of channel 36 in advance of the gates 104 and 78.

The arm 95 and its hub or collar 94 are provided with two pins 291 and 292 which when the pin 93 is out of engagement with the cam 89, serve to engage opposite end faces of a notch 294 in the collar 90 to lock the collar 90 to the collar 94 and gate 95 and cause the collar 90 and its pin 91 to rotate with the gate 95 until after the pin 91 is freed from the cam face 99, whereupon the pin 93 rides up the cam face 89 lifting the pins 291 and 292 out of the notch 294 and allowing the spring 92 to return the collar 90 and pin 91 to normal position relative to the hub 88. At the same time the shaft 75 moves downwardly clutching shaft 75 to its driving gear 80. The gate 95 remains partly open with its pin 96 bearing against pin 98 on the cam plate 97. As soon as shaft 75 commences to move it forces the stud 96 out of the path of pin 98. The gate 95 continues in open position until the bundle has been ejected, after which gate 95 energized by spring 112 returns to its normal position across the rear end of the guide channel, the pins 291 and 292 again enter the notch 294, and the parts are reset in position to lift the cam plate 97 and shaft 75 to unclutch the shaft 75 from its driving gear and to be acted upon by the next bundle fed along the guide channel.

In the modification Fig. 15, I have illustrated a knotter shaft 135 corresponding to the shaft 75 to which a driving gear 136 is rigidly attached. A tubular shaft 138 is splined to and movable to a limited extent endwise upon the shaft 135 and has rigidly attached thereto a cam plate 139 corresponding to the cam plate 97 of Fig. 3 and also with ejector gates 145 and 146 and the collar 147 corresponding respectively to the ejector gates 78 and 104 and collar 102 of Fig. 3 and operating substantially as described for Fig. 3. In both Fig. 3 and Fig. 15 the segmental gear 100 is splined to the endwise moving shaft and is journaled to the member 83 carried stationarily upon the side plate 38 of the guide channel.

In the modification Fig. 16, I have illustrated a sprocket chain 165 engaging a series of sprocket wheels 166, 167, 168 upon the shafts 42, 46, and 60, to drive said shafts in place of the spur gears illustrated in Figs. 7 and 8.

As illustrated in Fig. 1, I preferably provide cross plates 286 and 287 by means of which the frame members 16 upon opposite sides of the medial line of the harvester may be adjusted to and from each other to adapt the harvester to use upon corn rows spaced at varying distances apart, as for instance by providing duplicate sets of bolt holes 288 in the plates 286 and 287 to enable the bolts to be fitted selectively to one or other of said sets of holes as required.

The mechanism herein shown and described is capable of considerable modification within the scope of the claims without departing from the spirit of my invention.

What I claim is:

1. A corn harvester comprising mechanism to sever the corn in a row, shiftable pick-up members at opposite sides of the corn row adapted to have downwardly and forwardly inclined operative positions with their forward ends supported upon and to glide over the ground to pick up and guide the corn stalks into operative relation with said severing mechanism, said pick-up members being movable to retracted idle positions extending upwardly from the frame of the harvester and means carried by said harvester to shift said pick-up members from one position to the other.

2. A corn harvester comprising a harvester frame movable along a corn row, corn severing mechanism mounted upon said frame, a guide channel for the severed product leading from said severing mechanism and serving to conduct the severed product in an upright position from said severing mechanism, members to resiliently bear upon the severed product in said guide channel to insure feeding of the severed product in only one direction along said guide channel, a shoulder positioned in the rear end portion of said channel, a first feeding member operable in conjunction with said resilient members to intermittently feed the severed product away from the severing mechanism along said guide channel, a second feeding member in the rear and overlapping the operation of said first feeding member to intermittently feed the severed product in separate bundles a further distance along said guide channel, means to bind said bundles, and an ejector member intermittently operable to engage the upper portion of said respective bundles while the lower portion of said bundles are in engagement with the shoulder in said channel to tilt and eject said bundles.

3. A corn harvester comprising mechanism to sever the corn in the row, mechanism to feed the severed corn away from said severing mechanism, pick-up members pivotally attached to the frame of the harvester at opposite sides of the corn row and having downwardly and forwardly inclined operative positions to guide the corn stalks into operative relation to said severing mechanism and idle positions extending upwardly from the harvester frame, and manually operable means to shift said pick-up members from operative to idle position.

4. A corn harvester comprising a harvester frame movable along the corn row, corn severing mechanism mounted upon said frame, a guide channel for the severed product leading from said severing mechanism and serving to conduct the severed product in an upright position from said severing mechanism, members to resiliently bear upon the severed product through the central portion of said guide channel thereby providing said channel with a restricted central portion and a wider rear end portion, having a shoulder to engage the lower end of the bundle to assist in ejecting the bundle, a first feeding member operable to intermittently feed the severed product away from said severing mechanism into engagement with said resilient members, a second feeding member operable to intermittently take the severed product from said first feeding member and feed it in independent bundles along said guide channel, means to bind said bundles, and an ejector member intermittently operable to engage the upper portion of said respective bundles while the lower portion of said respective bundles are in engagement with a shoulder at the enlarged rear end portion of said guide channel to tilt and eject said bundles.

In testimony whereof I have hereunto affixed my signature.

JOSEPH WEBB.